(12) United States Patent
Liu (10) Patent No.: US 7,503,683 B2
(45) Date of Patent: Mar. 17, 2009

(54) LIGHT GUIDE METHOD OF DOUBLE-LAYER LIGHT GUIDE PLATE AND KEYPAD STRUCTURE USING THE DOUBLE-LAYER LIGHT GUIDE PLATE

(75) Inventor: Chang-Li Liu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 126 days.

(21) Appl. No.: 11/677,626

(22) Filed: Feb. 22, 2007

(65) Prior Publication Data
US 2008/0205032 A1 Aug. 28, 2008

(51) Int. Cl.
*F21V 7/04* (2006.01)
(52) U.S. Cl. .......................... 362/616; 362/26; 362/27; 200/314
(58) Field of Classification Search .................. 362/24, 362/26, 27, 616; 200/314
See application file for complete search history.

(56) References Cited

U.S. PATENT DOCUMENTS

| | | | |
|---|---|---|---|
| 6,598,987 B1 | 7/2003 | Parikka | |
| 6,882,380 B2 * | 4/2005 | Yu et al. | 349/61 |
| 6,979,112 B2 | 12/2005 | Yu et al. | |
| 6,991,359 B2 | 1/2006 | Leu et al. | |
| 7,232,969 B1 * | 6/2007 | Hsu et al. | 200/310 |
| 2006/0254894 A1 | 11/2006 | Jung et al. | |

* cited by examiner

Primary Examiner—Thomas M Sember (57) ABSTRACT

A keypad structure includes a circuit board, a reflecting plate, a second light guide plate, a second light guide plate, a shading strip, a first light guide plate, an elastic layer, a keypad module and a light source module. A shading strip is provided for attaching the second light guide plate to the first light guide plate. A hole at an overlapped position of the first and second light guide plates is provided for exposing the first light guide plate. A light emitting element of the second light guide plate is lit to project a single-color light onto a corresponding keypad. When the light emitting element of the first light guide plate is lit, different color lights are produced, such that a light transmission effect of single-color light or mixed multiple-color light occurs at the surface of the keypad corresponding to the first light guide plate.

18 Claims, 9 Drawing Sheets

FIG.12 ic # LIGHT GUIDE METHOD OF DOUBLE-LAYER LIGHT GUIDE PLATE AND KEYPAD STRUCTURE USING THE DOUBLE-LAYER LIGHT GUIDE PLATE

BACKGROUND OF THE INVENTION

1. Field of the Invention

The present invention relates to a keypad, and more particular to a double-layer light guide plate structure having different sizes of light guide plates and a light guide method.

2. Description of Prior Art

In addition to liquid crystal displays, signs, and advertising billboards, backlight modules are also used extensively in electronic products such as mobile phones and personal digital assistants. Since a backlight module is generally installed in a keypad, users can operate the keypad successfully even at nighttime or in a dark environment.

Traditional keypads install a light guide plate inside a keypad structure and a light emitting diode at the periphery or the bottom of the light guide plate. When the electronic product is used, the light emitting diode will be lit immediately, and the emitted light will be guided into the light guide plate. By then, the light guide plate guides the light to the keypad installed at the top of the light guide plate to create a light transmission effect at the surface of the keypad, so that users can see the word, number or symbol on the surface of each key clearly.

Figure 1:
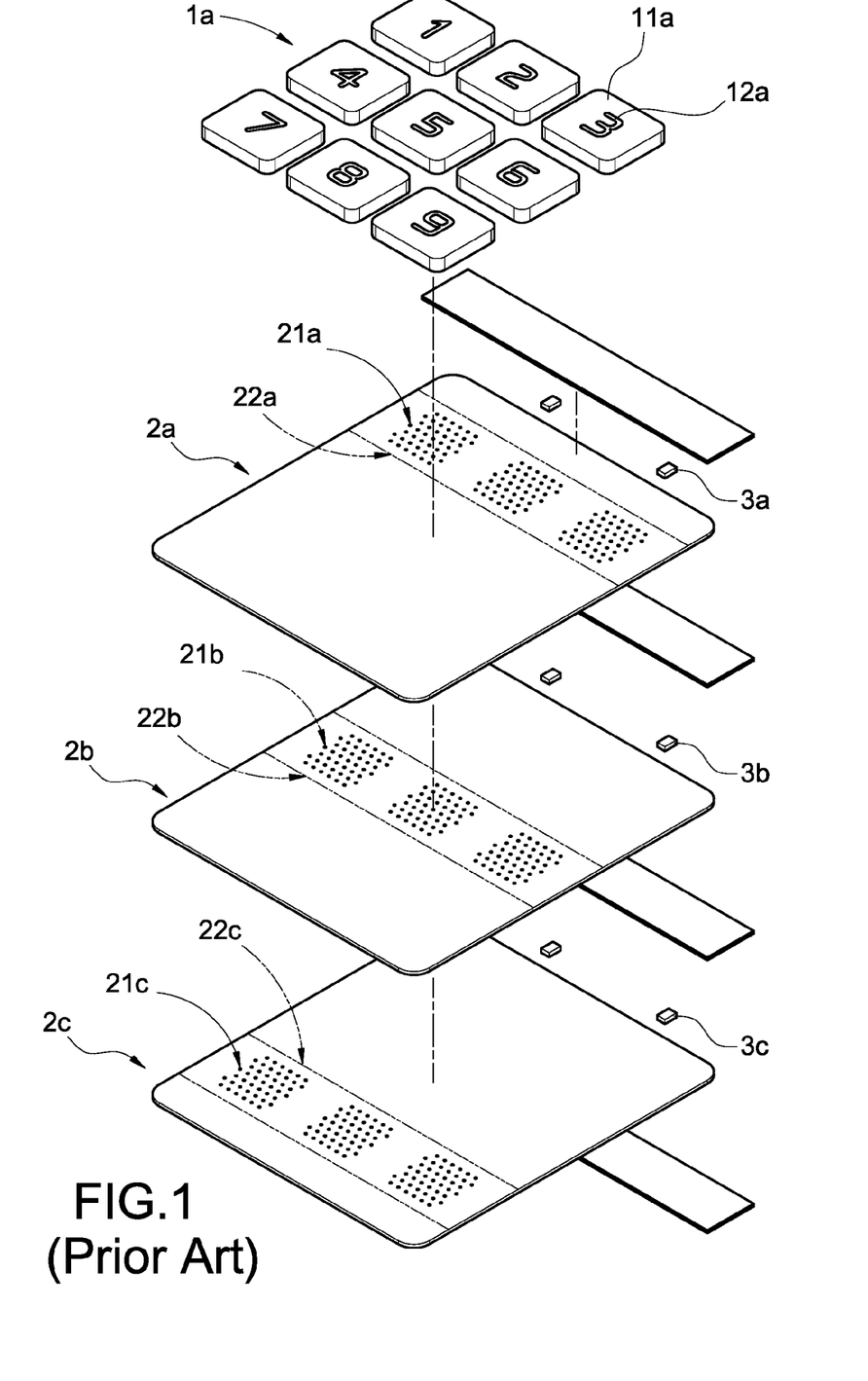
FIG. 1 is an exploded view of a prior art keypad structure.

Traditional backlights used for keypads produce single-color light only, and color patterns are printed on the keys of a keypad, such that a color light transmission effect can be created at the surface of the keypad. Since the color patterns printed on the keypad requires a process of performing ink printing for several times in order to print the patterns on the keypad, therefore such process consumes much manufacturing time and effort, and the inventor of the present invention discloses a technology as illustrated in FIG. 1 to overcome the foregoing shortcomings. A hollow word 12a or pattern is printed onto each key 11a of a keypad module 1a, and a light guide structure is installed at the bottom of the keypad module 1a. The light guide structure is comprised of a plurality of light guide plates 2a, 2b, 2c, and at least one light guide band 21a, 21b, 21c is formed on a layer of light guide plate 2a, 2b, 2c and disposed at a position corresponding to the key 11a. The light guide bands 21a, 21b, 21c are arranged alternately or stacked on each other, and the light guide band has a color layer 22a, 22b, 22c. If an electronic device controls and selectively lights up each layer of light emitting elements 3a, 3b, 3c one by one, each layer of the light guide bands 21a, 21b, 21c will produce different color lights or mixed color lights which are refracted to the corresponding keys 11a of the keypad module 1a respectively, such that each key 11a will be able to create a light transmission effect with different color lights and show the word, number or pattern on the surface of the keypad.

Although the design of the foregoing light guide structure can provide an effect of a change of color for the multi-color light at the surface of the keypad, yet the thickness and hardness of the light guide structure will be increased. Users may find it difficult to press the key 11a, and need to apply an excessive force to the keys for the operation. As a result, the keys are pressed onto the metal bracket, and the metal bracket is deformed and touched the circuit board, and thus this design of keypad structure requires further improvements.

SUMMARY OF THE INVENTION

In view of the foregoing shortcomings of the prior art, the inventor of the present invention based on years of experience in the related industry to conduct experiments and modifications, and finally invented a double-layer light guide plate structure having different sizes of light guide plates and a light guide method.

It is a primary objective of the present invention to provide a double-layer light guide plate structure having different sizes of light guide plates, and the light guide plate structure is applied in a keypad structure, and a hole is disposed at an overlapped position of the large light guide plate and the small light guide plate for exposing the small light guide plate, such that if a key corresponding to the small or large light guide plate is pressed, then the traveling path of the pressed key will not be affected by the thickness of another layer of light guide plate.

To achieve the foregoing objective of the present invention, light guide plates of different sizes are installed inside the keypad structure, and a shading strip is attached at the periphery of the small light guide plate, and the small light guide plate is attached at the bottom of the large light guide plate, and a hole is created at an overlapped position of the large light guide plate and the small light guide plate for exposing the small light guide plate. If an external light emitting element corresponding to the smaller one of the two light guide plates is lit, the small light guide plate will produce single-color light, and light will be collected and projected from the light guide portion to a key corresponding to the small light guide plate. If the light emitting element corresponding to the large light guide plate is lit, then the light emitting element will produce different color lights, such that a light transmission effect with single-color light or mixed multiple-color light will be created at the surface of a key corresponding to the large light guide plate.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 2:
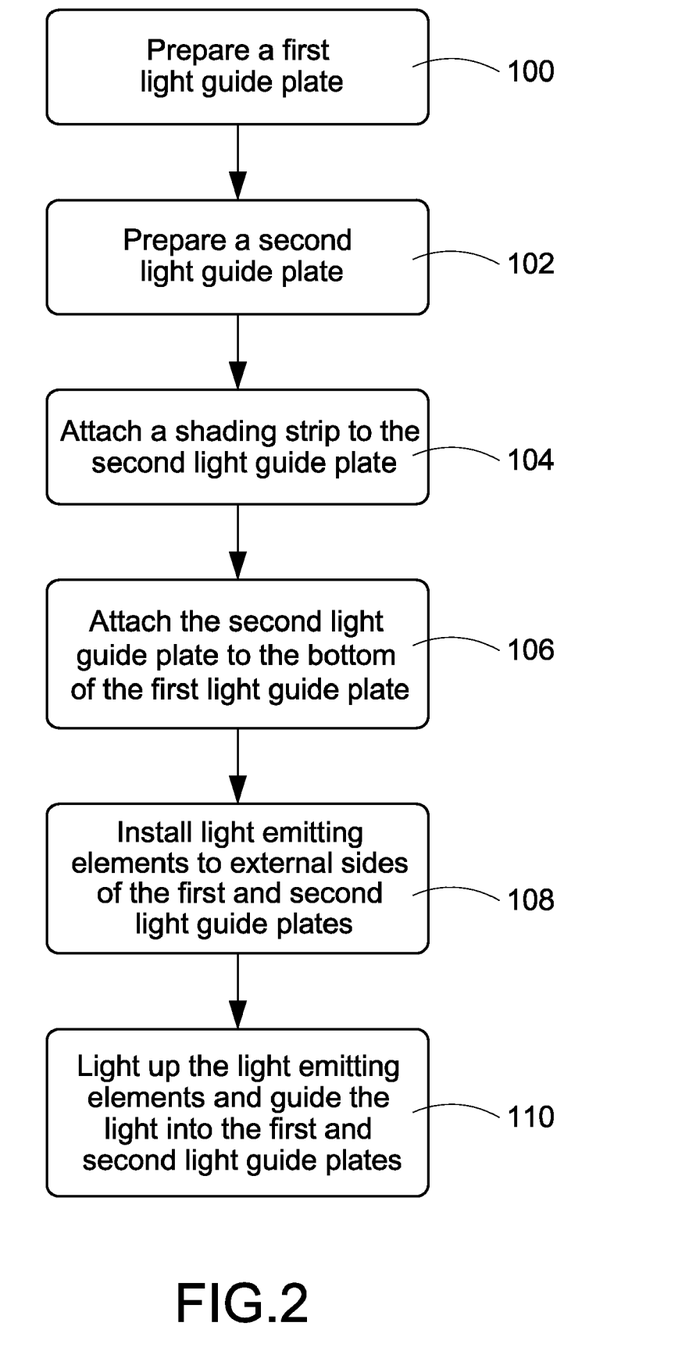
FIG. 2 is a flow chart of a light guide method of a light guide plate of the present invention.

Referring to FIG. 2 for a flow chart of a light guide method of a light guide plate of the present invention, the method illustrated in the figure is a shading method of the light guide plate. In Step 100, a large first light guide plate is prepared first, and then a lump light guide portion and a frame light guide portion are formed on the surface of the first light guide plate, and two symmetric holes are formed at appropriate positions.

In Step 102, a small second light guide plate is prepared, and the second light guide plate is comprised of two carriers. The carrier is slightly larger than the area of the hole of the first light guide plate, and the surface of the second light guide plate has a lump light guide portion.

In Step 104, a layer of shading strip is attached to the periphery of the second light guide plate.

In Step 106, the second light guide plate is attached to the bottom of the first light guide plate and disposed at the hole, such that the lump light guide portion of the second light guide plate is exposed.

In Step 108, external light emitting elements are disposed at positions corresponding to lateral sides (or ends) of the first light guide plate and the second light guide plate, and the external light emitting element corresponding to the first light guide plate emits multi-color light, and the external light emitting element corresponding to the second light guide plate emits single-color light.

In Step 110, if the light emitting element corresponding to the second light guide plate is lit, then the second light guide plate will produce single-color light, and the light is collected and projected from the light guide portion onto a specified key of the second light guide plate, so that a light transmission effect is created at the surface of the specified key. If the light emitting element corresponding to an external control circuit of the first light guide plate is lit, then the light emitting element will produce different color lights, so that a mixed light effect of the single-color light or multi-color light will be created at the first light guide plate, and a light transmission effect of single-color light or multi-color light will be created on the surface of a key corresponding to the first light guide plate.

Figure 3:
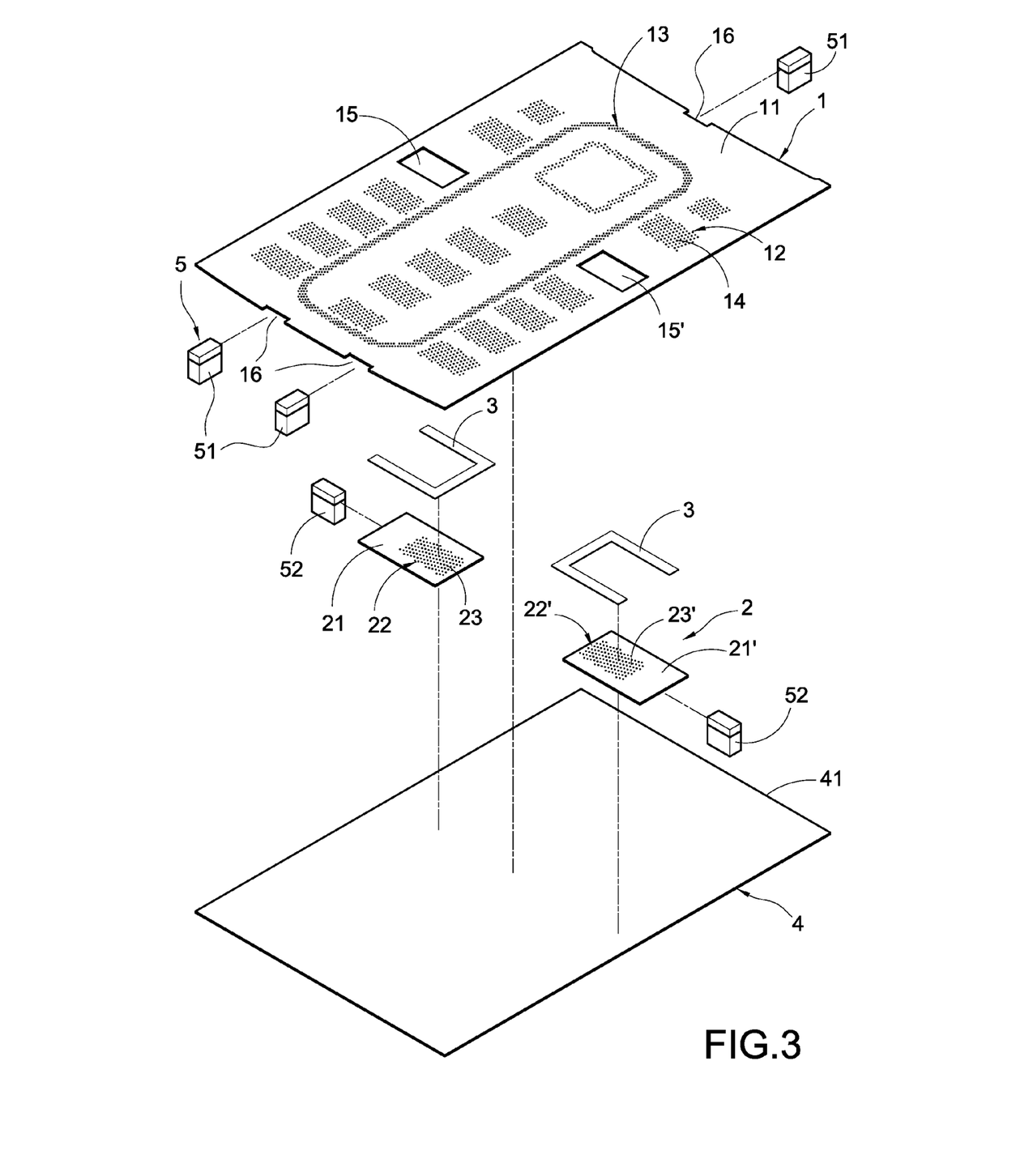
FIG. 3 is an exploded view of a first type of light guide plate of the present invention.

Referring to FIG. 3 for is an exploded view of a first type of light guide plate of the present invention, the light guide structure comprises: a first light guide plate 1, a second light guide plate 2, a shading strip 3, a reflecting plate 4 and a light source module 5.

Figure 4:
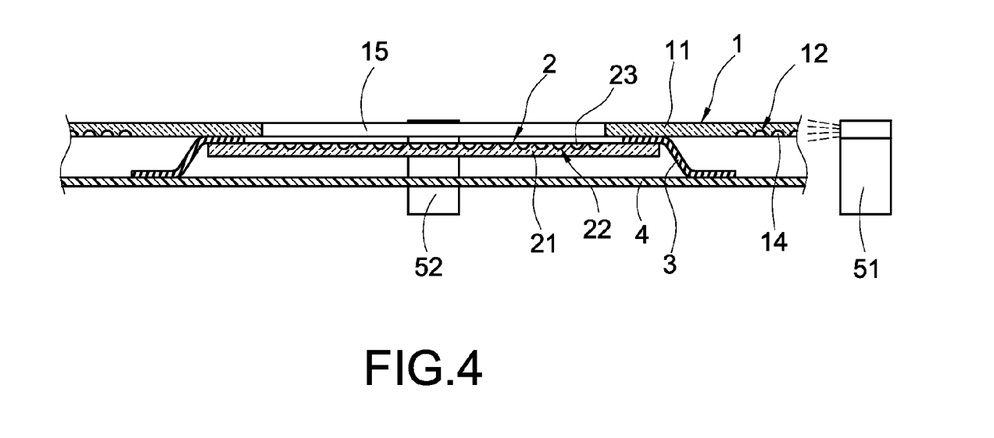
FIG. 4 is a side view of FIG. 3.
Figure 5:
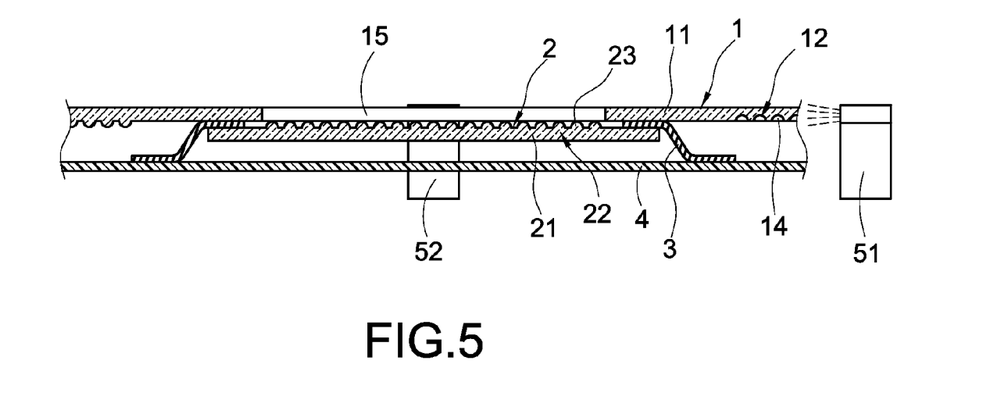
FIG. 5 is a schematic view of another preferred embodiment of FIG. 3.

Referring to FIGS. 4 and 5, the first light guide plate 1 is a carrier 11 made of a transparent color PC film or TPU film material, and the carrier 11 has a lump light guide portion 12, and a frame light guide portion 13, and the lump light guide portion 12 guides the light to a corresponding single key, and the frame light guide portion 13 guides the light to a specified keypad module and the lump light guide portion 12. The frame light guide portion 13 is comprised of a plurality of light guide microstructures 14, and the light guide microstructure 14 is in the shape of a semicircular concave hole or a semicircular protruding dot. After outside light is guided into the carrier 11, the light guide microstructure 14 changes the path of the light, such that the light can be collected and projected onto the keypad, and two symmetric holes 15, 15' are disposed at the positions of specified keys (such as the green dialing key and the red end key) corresponding to the carrier 11, and two distal edges of the carrier 11 separately have a notch 16, and a light emitting element 51 emitting multi-color light is installed at the notch 16.

The second light guide plate 2 is a sheet carrier 21, 21' made of a PC film or TPU film material and installed at the bottom of the first light guide plate 1, and the area of the carrier 21, 21' is slightly larger than the diameter of the hole 15, 15', and a lump light guide portion 22, 22' is disposed on the surface of the carrier 21, and the lump light guide portion 22, 22' is comprised of a plurality of light guide microstructures 23, and the light guide microstructure 23, 23' is in the shape of a semicircular concave hole or a semicircular protruding dot. When the second light guide plate 2 is installed at the hole 15, 15', the lump light guide portion 22, 22' corresponding to the two carriers 21, 21' is exposed from the hole 15, 15'.

The shading strip 3 is a black U-shape strip attached at edges of the two carriers 21, 21', for preventing the light from being projected directly onto the light first light guide plate 1, when light is guided.

The reflecting plate 4 has a white plastic carrier 41 attached onto the bottom of the first and second layers of light guide plate 1, 2, and used for collecting and reflecting the light guided from the first and second layers of light guide plate 1, 2 upward.

The light source module 5 is comprised of a light emitting element 51 emitting multi-color light and a light emitting element 52 emitting single-color light, and the light emitting element 51 emitting multi-color light is installed at the notch 16 of the first light guide plate 1, and the light emitting element 52 emitting single-color light is installed at a side of the second light guide plate 2.

If the light emitting elements 51, 52 are lit, the light are guided into the first light guide plate 1 and the second light guide plate 2 at the same time. Since the light emitting element 51 of the multi-color light is controlled by an external circuit, several light emitting elements 51 of the multi-color light create a mixed light effect with changes of colors when the light emitting elements 51 are lit, and create an effect with a change of color for the key corresponding to the first light guide plate 1. The light emitting element 52 of the single-color light only produces single-color light for showing the green and red color lights of the dialing key printed with a green pattern and an end key printed by a red pattern. Since a layer of shading strip 3 exists between the first light guide plate 1 and the second light guide plate 2, the lights guided between the first and second layers of light guide plates 1, 2 will not interfere with each other.

Figure 6:
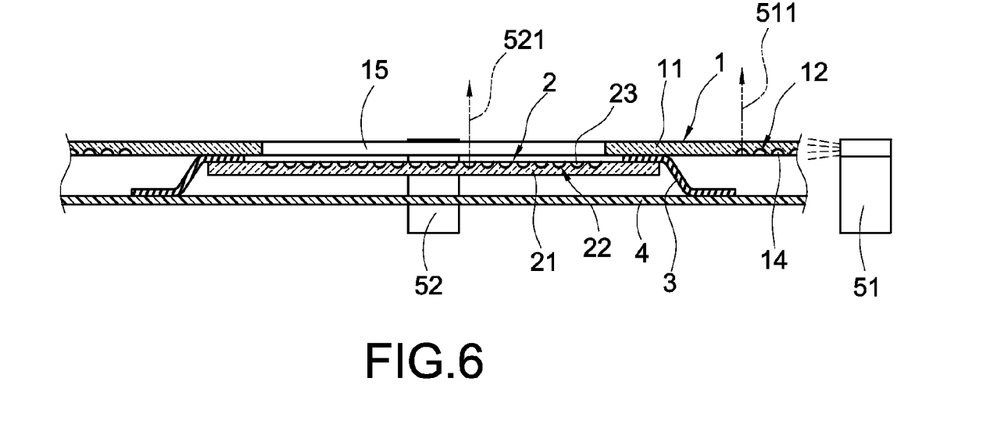
FIG. 6 is a schematic view of a light guide of first and second layers of light guide plates of FIG. 3.

In FIG. 6, if outside light 511, 521 are guided into the first and second layers of light guide plates 1, 2, and passed through the light guide microstructure 14, 23, 23', the light guide microstructures 14, 23, 23' will change the path of the light 511, 5211, and drive the light 511, 521 to be collected and projected onto the corresponding key.

If a user presses the dialing key and the end key, the press keys will be passed directly through the holes 15, 15' and pressed on the second light guide plate 2, such that the second light guide plate 2 and the reflecting plate 4 will be deformed and pressed at the mechanism below, and thus the user will no longer have the difficult to feel the pressing of keys anymore. Similarly, if a user presses a key corresponding to the first light guide plate 1, the pressing will not be affected by the second light guide plate 2 or difficult to be felt by users.

Figure 7:
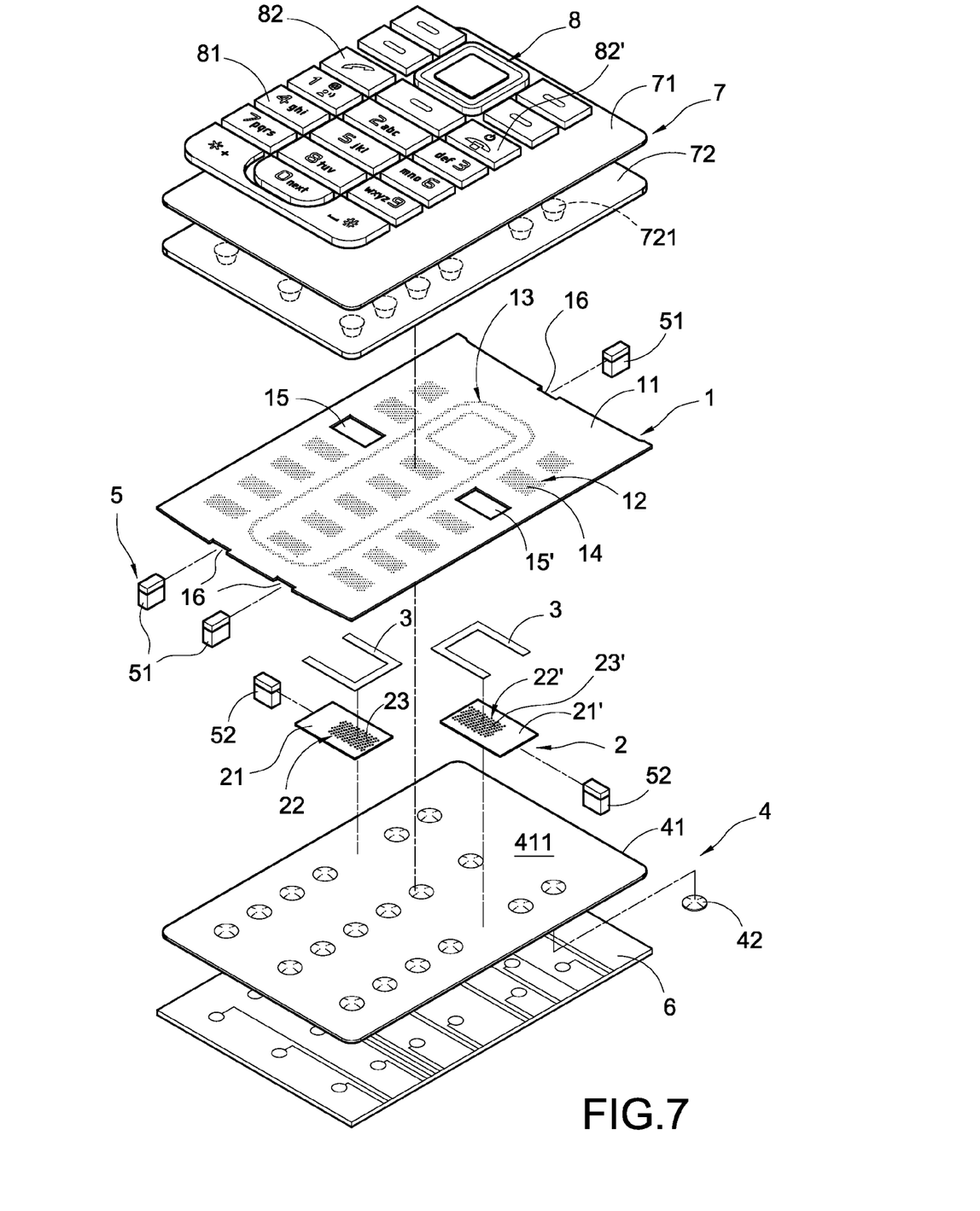
FIG. 7 is an exploded view of a light guide plate and a keypad structure of the present invention.

Referring to FIG. 7 for a schematic view of applying a light guide plate and a keypad structure together in accordance with the present invention, the keypad structure comprises a circuit board 6, reflecting plate 4, a second light guide plate 2, a shading strip 3, a first light guide plate 1, an elastic layer 7, a keypad module 8 and a light source module 5.

The circuit board 6 is a thin film printed circuit board printed with circuits.

The reflecting plate 4 is a white carrier 41 made of a hard PC material, and disposed on a surface of a circuit board 6, and the bottom of the reflecting plate 4 has a plurality of metal brackets 42, such that if the metal bracket 42 is pressed and deformed, a snapping sound will be produced to achieve the effect of letting users feel the pressing of a key 81.

The second light guide plate 2 is installed at a surface of the reflecting plate 4, and has a sheet carrier 21, 21' made of a transparent colorless PC film or TPU film material, and the surface of the two carriers 21, 21' has a lump light guide portion 22, 22', and the light guide portion 22, 22' is comprised of a plurality of light guide microstructures 23.

The shading strip 3 is a black U-shape strip attached to edges of the two carriers 21, 21' for preventing a light from being projected directly onto the first light guide plate 1, if the light is guided into the two carriers 21, 21'.

The first light guide plate 1 is installed on the surfaces of the reflecting plate 4, second light guide plate 2 and shading strip 3, and the carrier 11 has a lump light guide portion 12 and a frame light guide portion 13, and the light guide portions 12, 13 are comprised of a plurality of light guide microstructures 14, and the carrier 11 has two symmetric holes 15, 15' disposed thereon and a notch 16 disposed separately on both distal ends of the carrier 11.

The elastic layer 7 is disposed on a surface of the first light guide plate 1, and comprised of a fill light plate 71 and an elastic body 72. The fill light plate 71 is made of a hard transparent PC material, and the elastic body 72 is made of a soft PC plastic material, and the fill light plate 71 and the elastic body 72 are combined by a hot pressing technology, and the bottom of the elastic body 72 has a plurality of protruding members 721.

The keypad module 8 is comprised of a plurality of keys 81 and installed on a surface of the elastic layer 7, and each key 81 is made of a material with the light transmission effect, and its surface has a number, a word or a symbol with the light transmission effect.

The light source module 5 is comprised of a light emitting element 51 of a multi-color light and a light emitting element 52 of a single-color light, and the light emitting element 51 of the multi-color light is installed at the notch 16 of the first light guide plate 1, and the light emitting element 52 of the single-color light is installed at a side of the second light guide plate 2.

Figure 8:
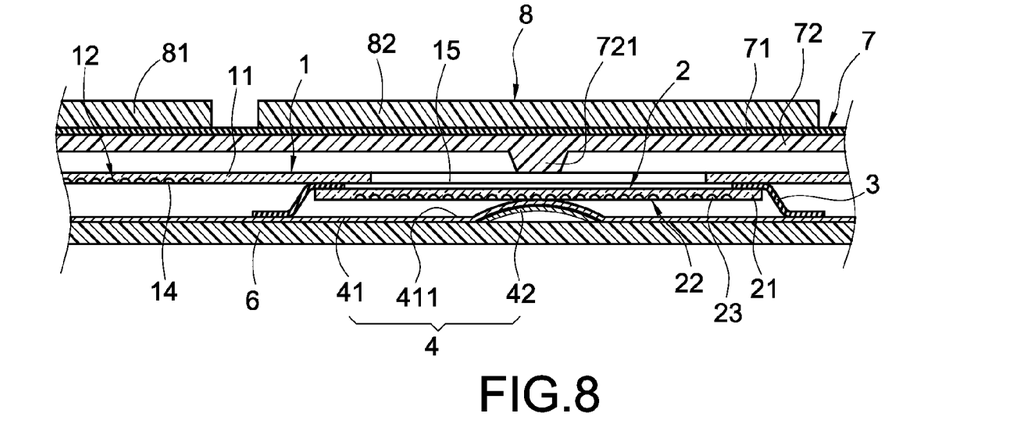
FIG. 8 is a side view of FIG. 7.
Figure 9:
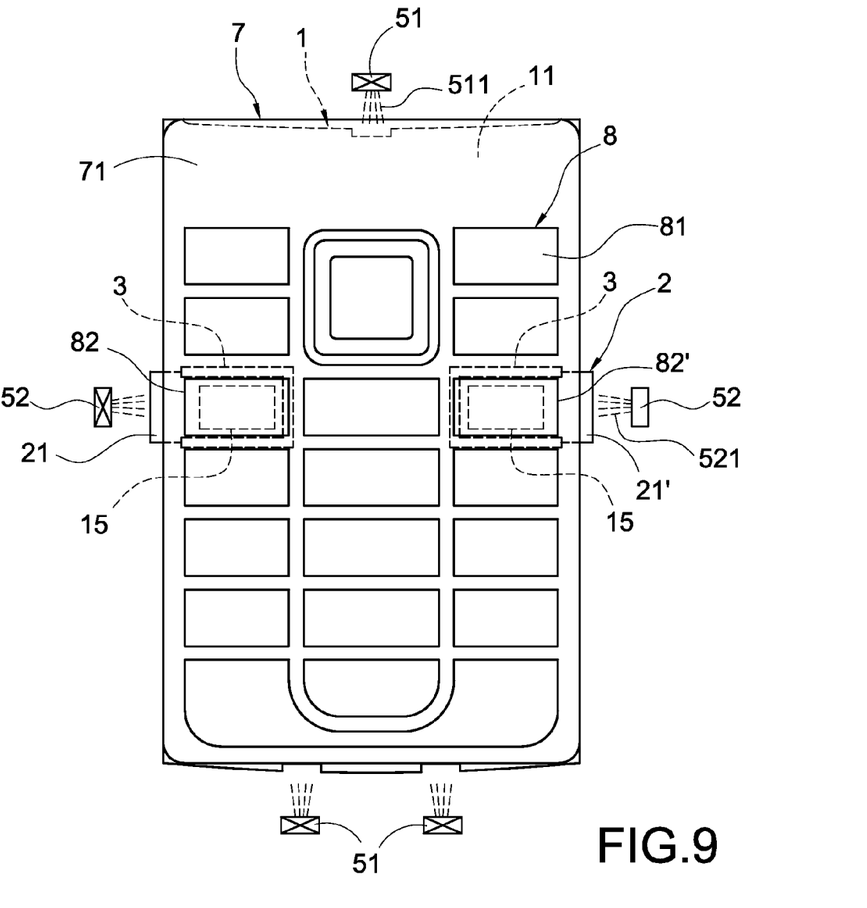
FIG. 9 is a top view of FIG. 7.

Referring to FIGS. 8 and 9, if the light emitting elements 51, 52 are lit, lights 511, 521 are guided into the first light guide plate 1 and the second light guide plate 2 respectively. Since the light emitting element 51 emitting multi-color light is controlled by an external circuit, a mixed light effect with a change of colors can be created by several light emitting elements 51 emitting multi-color light, such that the key 81 corresponding to the first light guide plate 1 has the effect of a change of colors. The light emitting element 52 of a single-color light produces a single-color light only for showing the green and red color lights of the dialing key 82 printed with a green pattern and an end key 82' printed with a red pattern. Since a layer of shading strip 3 exists between the first light guide plate 1 and the second light guide plate 2, therefore lights guided into the first and second layers of light guide plate 1, 2 will not interfere with each other.

In the meantime, the key 82 or 82' is pressed by an external force, so that a protruding body 721 of the elastic body 72 is passed through the hole 15, 15' and pressed on the carrier 21, 21' of the second light guide plate 2, and the carrier 21, 21' is pressed on the surface of the reflecting plate 4 to deform and press the metal bracket 42 at the circuit board 6, and the circuit board 6 will transmit a signal during the process of pressing the key 82, 82' and the metal bracket 42 will produce a snapping source to let users feel the effect of pressing the key 82.

Figure 10:
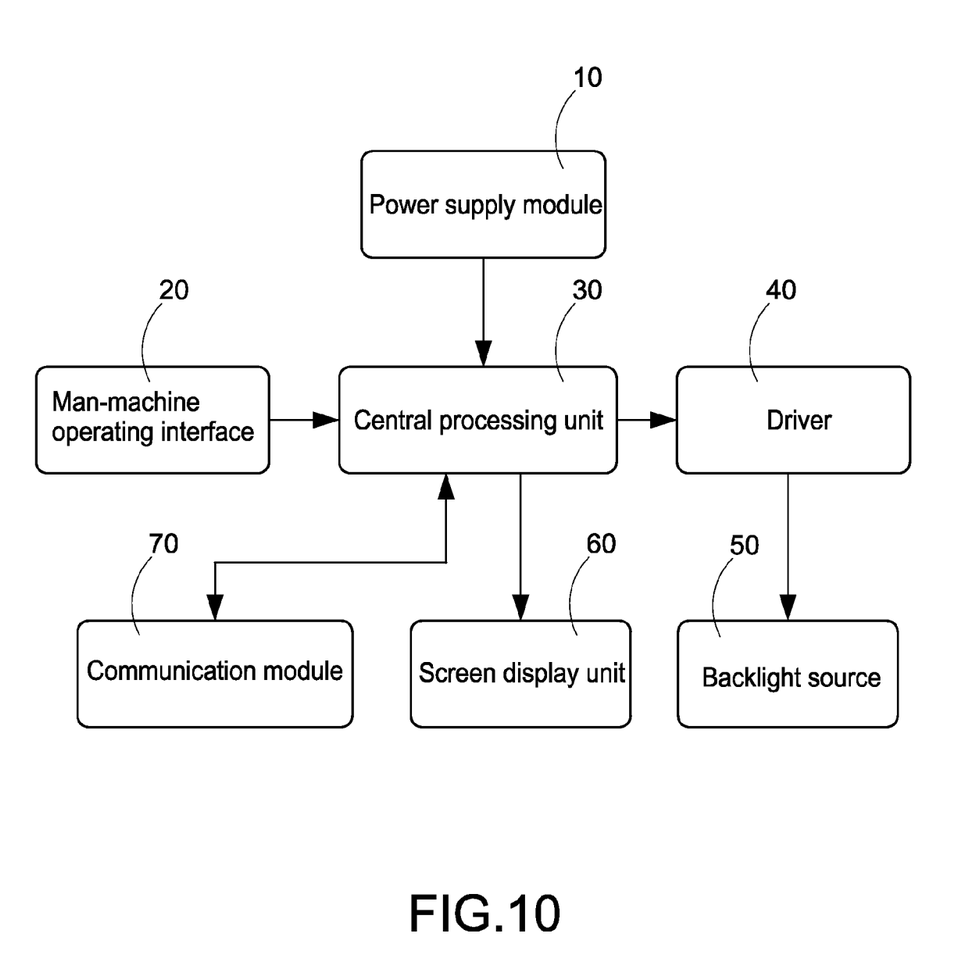
FIG. 10 is a schematic circuit block diagram of a control circuit of the present invention.

Referring to FIG. 10 for a schematic view of a control circuit of the present invention, this figure simply illustrates the principle of operations of a prior art, and the control circuit comprises a power supply module 10, a man-machine operating interface 20, a central processing unit 30, a driver 40, a backlight source 50, screen display unit 60 and a communication module 70.

The power supply module 10 is electrically coupled to the central processing unit 30 for supplying the required power to the central processing unit 30, and an example of power supply module 10 is a mobile phone battery.

The man-machine operating interface 20 is electrically coupled to the central processing unit 30 for inputting information, feeding back signals and transmitting signals to central processing unit 30, and an example of the man-machine operating interface 20 is a mobile phone keypad.

The central processing unit 30 is electrically coupled to the man-machine operating interface 20 for receiving a signal from the man-machine operating interface 20 for the operation, and the operation result is sent to another unit or module such as a computational logic IC.

The driver 40 is electrically coupled to the central processing unit 30 for receiving a driving signal outputted by the central processing unit 30 to drive the backlight source 50 to produce a specific color light;

The backlight source 50 is comprised of the light emitting element 51 of the multi-color light and the light emitting element 52 of the single-color light of the foregoing light source module, and electrically coupled to the driver 40 for receiving a driving signal outputted by the driver to light up the light emitting elements 51, 52. In the meantime, the central processing unit 30 loads a software and controls the light emitting element 51 to produce a change of multi-color lights, so that an effect of a change of colors is created at the surface of a keypad corresponding to the first light guide plate 1.

The screen display module 60 is electrically coupled to the central processing unit 30, and the central processing unit produces a screen, and the screen display module 60 is comprised of a TFT LCD panel.

The communication module 70 is electrically coupled to the central processing unit 30, and its communication function is enabled or disabled by the control of a central processing unit 30.

Figure 11:
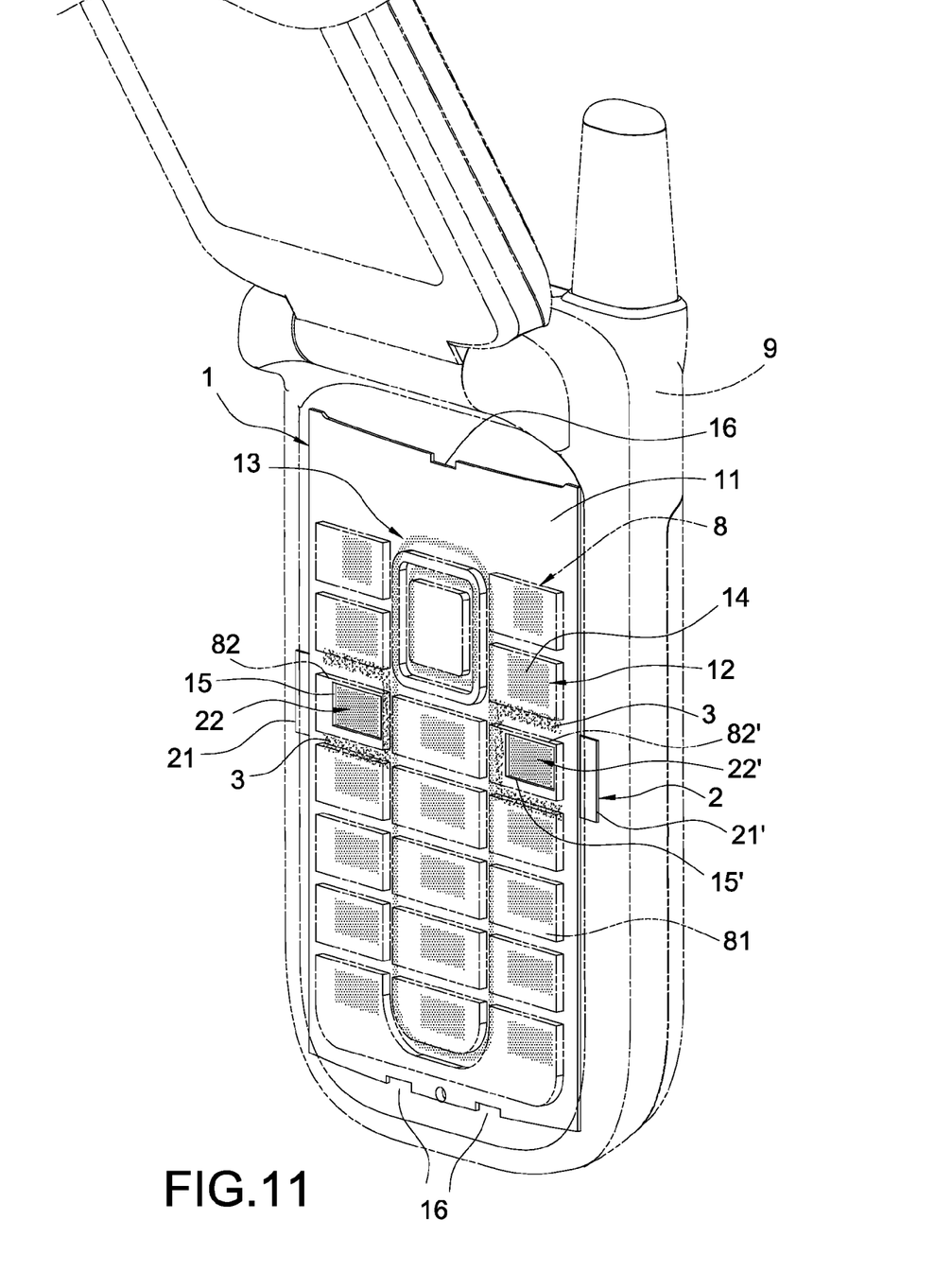
FIG. 11 is a schematic view of a light guide plate applied to a mobile phone in accordance with the present invention.

Referring to FIG. 11 for a schematic view of using a light guide plate in accordance with the present invention, first and second layers of light guide plate 1, 2 are installed in a keypad structure of a mobile phone 9. If the mobile phone 9 is in use, the first and second layers of light guide plate 1, 2 will guide the light to provide an effect of a change of colors for the key 81 corresponding to the first light guide plate 1. The light emitting element 52 of the single-color light produces single-color light only for displaying the green and red color lights of a dialing key 82 printed with a green pattern and an end key 82' printed with a red pattern.

Figure 12:
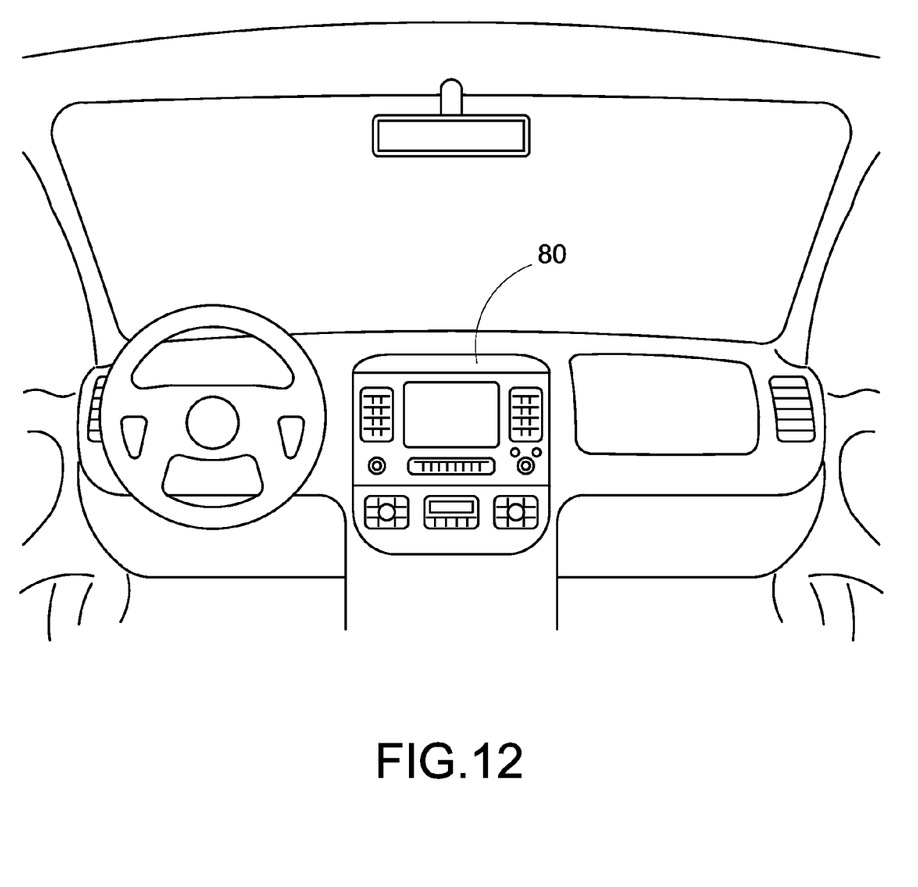
FIG. 12 is a schematic view of a keypad structure applied to an automobile stereo panel in accordance with the present invention.

Referring to FIG. 12 for a schematic view of a keypad structure applied to an automobile stereo panel in accordance with the present invention, the panel of the keypad structure is used for mobile phones and also can be installed on an automobile stereo panel 80 to control an air conditioning system, an audio/video system and a global position system, etc.

The present invention is illustrated with reference to the preferred embodiment and is not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A keypad structure, comprising:
   a circuit board;
   a reflecting plate, installed at a surface of said circuit board, and having a plurality of metal brackets disposed at a bottom of said reflecting plate;
   a second light guide plate, installed onto a surface of said reflecting plate through two carriers;
   a shading strip, attached to edges of said two carriers;
   a first light guide plate, installed at the surfaces of said reflecting plate, said second light guide plate and said shading strip, and having a carrier, and said carrier having two symmetric holes;
   an elastic layer, disposed on a surface of said first light guide plate, and comprised of a fill light plate and an elastic body, and a plurality of protruding members being formed at a bottom of said elastic body; and
   a keypad module, disposed on a surface of said elastic layer.

2. The keypad structure of claim 1, wherein said circuit board is a film printed circuit board.

3. The keypad structure of claim 1, wherein said reflecting plate is a white carrier made of a hard PC material.

4. The keypad structure of claim 1, wherein said two carriers of said second light guide plate are made of a transparent colorless PC film or TPU film material.

5. The keypad structure of claim 1, wherein said second light guide plate has a lump light guide portion disposed on the surface of said second light guide plate.

6. The keypad structure of claim 5, wherein said light guide portion is comprised of a plurality of light guide microstructures.

7. The keypad structure of claim 1, wherein said shading strip is a black U-shaped strip.

8. The keypad structure of claim 1, wherein said two carriers of said first light guide plate are made of a transparent colorless PC film or TPU film material.

9. The keypad structure of claim 1, wherein said first light guide plate has a lump light guide portion and a frame light guide portion disposed on the surface of said first light guide plate.

10. The keypad structure of claim 9, wherein said light guide portion is comprised of a plurality of light guide microstructures.

11. The keypad structure of claim 10, wherein said light guide microstructure is in the shape of a semicircular concave hole or a semicircular protruding dot.

12. The keypad structure of claim 9, wherein said lump light guide portion guides light onto a corresponding single key.

13. The keypad structure of claim 9, wherein said frame light guide portion guides light onto a specific keypad module.

14. The keypad structure of claim 1, wherein said carrier of said first light guide plate has a notch disposed separately on both distal edge of said carrier.

15. The keypad structure of claim 1, wherein said fill light plate is made of a hard transparent PC material, and said elastic body is made of a soft PC plastic material.

16. The keypad structure of claim 1, wherein said keypad module is comprised of a plurality of keys, and said each key is made of a material having a light transmission effect, and the surface of said each key has a number, a text, or a symbol having a light transmission effect.

17. The keypad structure of claim 1, further comprising a light emitting element with a multi-color light installed at any position of either one side or both sides of said first light guide plate.

18. The keypad structure of claim 13, further comprising a light emitting element with a single-color light installed at a position on a side of said second light guide plate.

* * * * *

UNITED STATES PATENT AND TRADEMARK OFFICE
CERTIFICATE OF CORRECTION

PATENT NO. : 7,503,683 B2 Page 1 of 1
APPLICATION NO. : 11/677626
DATED : March 17, 2009
INVENTOR(S) : Chang-Li Liu

It is certified that error appears in the above-identified patent and that said Letters Patent is hereby corrected as shown below:

On the cover page, item [73]

Assignee: should read --ICHIA TECHNOLOGIES, INC. Taoyuan(TW)--

Signed and Sealed this

Ninth Day of November, 2010

David J. Kappos
*Director of the United States Patent and Trademark Office*